US012731996B2

(12) United States Patent
Zhang et al.

(10) Patent No.: US 12,731,996 B2
(45) Date of Patent: Sep. 8, 2026

(54) ENERGY STORAGE SYSTEM CONTROL METHOD, DEVICE AND ENERGY STORAGE SYSTEM

(71) Applicant: GINLONG TECHNOLOGIES CO., LTD., Ningbo (CN)

(72) Inventors: Wenping Zhang, Ningbo (CN); Yiming Wang, Ningbo (CN); Po Xu, Ningbo (CN); Dong Zhou, Ningbo (CN); Kun Cheng, Ningbo (CN); Jianqiang Ji, Ningbo (CN)

(73) Assignee: GINLONG TECHNOLOGIES CO., LTD., Ningbo (CN)

( * ) Notice: Subject to any disclaimer, the term of this patent is extended or adjusted under 35 U.S.C. 154(b) by 0 days.

(21) Appl. No.: 18/707,116

(22) PCT Filed: Sep. 5, 2023

(86) PCT No.: PCT/CN2023/116939
§ 371 (c)(1),
(2) Date: May 2, 2024

(87) PCT Pub. No.: WO2024/078198
PCT Pub. Date: Apr. 18, 2024

(65) Prior Publication Data

US 2025/0266686 A1 Aug. 21, 2025

(30) Foreign Application Priority Data

Oct. 14, 2022 (CN) ......................... 202211256365.1

(51) Int. Cl.
*H02J 3/32* (2026.01)
*H02J 3/01* (2026.01)
(Continued)

(52) U.S. Cl.
CPC .................. *H02J 3/32* (2013.01); *H02J 3/01* (2013.01); *H02J 3/381* (2013.01); *H02J 2101/24* (2026.01); *H02J 2103/30* (2026.01)

(58) Field of Classification Search
CPC ............ C12Q 1/6883; C12Q 2600/136; C12Q 2600/156; C12Q 2600/158;
(Continued)

(56) References Cited

U.S. PATENT DOCUMENTS

2010/0301670 A1* 12/2010 Wilhelm .................. G05F 3/08 361/18
2011/0130889 A1* 6/2011 Khajehoddin .......... H02J 3/381 700/298
(Continued)

FOREIGN PATENT DOCUMENTS

CN 105471238 A 4/2016
CN 110620377 A 12/2019
(Continued)

OTHER PUBLICATIONS

Daud et al., An Optimal Control Strategy for DC Bus Voltage Regulation in Photovoltaic System with Battery Energy Storage, Mar. 17, 2014, Hindawi Publishing Corporation, The Scientific World Journal, vol. 2014, Article ID 271087, pp. 1-16. (Year: 2014).*

(Continued)

*Primary Examiner* — Kidest Worku
(74) *Attorney, Agent, or Firm* — Cooper Legal Group, LLC

(57) ABSTRACT

The present disclosure provides an energy storage system control method, device, and energy storage system, which relate to the technical field of photovoltaic. The energy storage system control method according to the present disclosure includes: acquiring a PV voltage, a battery volt-
(Continued)

Acquire a PV voltage, a battery voltage, and a voltage on line side, determine a bus voltage reference value according to the PV voltage, the battery voltage, and the voltage on line side, and determine a reference phase-shifting angle or a reference frequency according to the bus voltage reference value Acquire a current on battery side, and determine a bridge arm phase-shifting angle change amount or frequency change amount according to a low-frequency component of the current on battery side needing to be suppressed Determine a bridge arm phase shifting angle according to the reference phase-shifting angle and the bridge arm phase shifting angle change amount, or determine a switching frequency according to the reference frequency and the change amount of the frequency Suppress low-frequency ripple according to the bridge arm phase shifting angle or the switching frequency age and a grid-side voltage, determining a bus voltage reference value according to the PV voltage, the battery voltage and the grid-side voltage, and determining a phase shifting angle reference or a frequency reference according to the bus voltage reference value; acquiring a current on battery side, and determining a bridge arm phase shifting angle change amount or frequency change amount according to a low-frequency component of the current on battery side needing to be suppressed; determining a bridge arm phase shifting angle according to the phase shifting angle reference and the bridge arm phase shifting angle change amount.

13 Claims, 7 Drawing Sheets

(51) Int. Cl.
*H02J 3/38* (2006.01)
*H02J 101/24* (2026.01)
*H02J 103/30* (2026.01)

(58) Field of Classification Search
CPC ............ C12Q 2600/172; H02J 2101/24; H02J 2103/30; H02J 3/01; H02J 3/32; H02J 3/38; H02J 3/381; H02J 7/35; Y02E 10/56; Y02E 70/30; Y02E 30/00; Y02E 20/00
See application file for complete search history.

(56) References Cited

U.S. PATENT DOCUMENTS

2014/0306670 A1* 10/2014 Li ......................... H02M 3/156
323/234
2017/0338651 A1 11/2017 Fishman et al.

FOREIGN PATENT DOCUMENTS

CN 111478610 A * 7/2020 .......... H02M 7/5395
CN 114123203 A 3/2022
CN 115333133 A 11/2022

OTHER PUBLICATIONS

Zhang et al., A novel MMC bridge arm protection based on sum current of upper and lower bridge arms, Sep. 25, 2022, International Journal of Electrical Power and Energy Systems, pp. 1-13 (Year: 2022).*
International Search Report of PCT/CN2023/116939.
Written Opinion of PCT/CN2023/116939.

* cited by examiner

Acquire a PV voltage, a battery voltage, and a voltage on line side, determine a bus voltage reference value according to the PV voltage, the battery voltage, and the voltage on line side, and determine a reference phase-shifting angle or a reference frequency according to the bus voltage reference value Acquire a current on battery side, and determine a bridge arm phase-shifting angle change amount or frequency change amount according to a low-frequency component of the current on battery side needing to be suppressed Determine a bridge arm phase shifting angle according to the reference phase-shifting angle and the bridge arm phase shifting angle change amount, or determine a switching frequency according to the reference frequency and the change amount of the frequency Suppress low-frequency ripple according to the bridge arm phase shifting angle or the switching frequency

FIG. 1

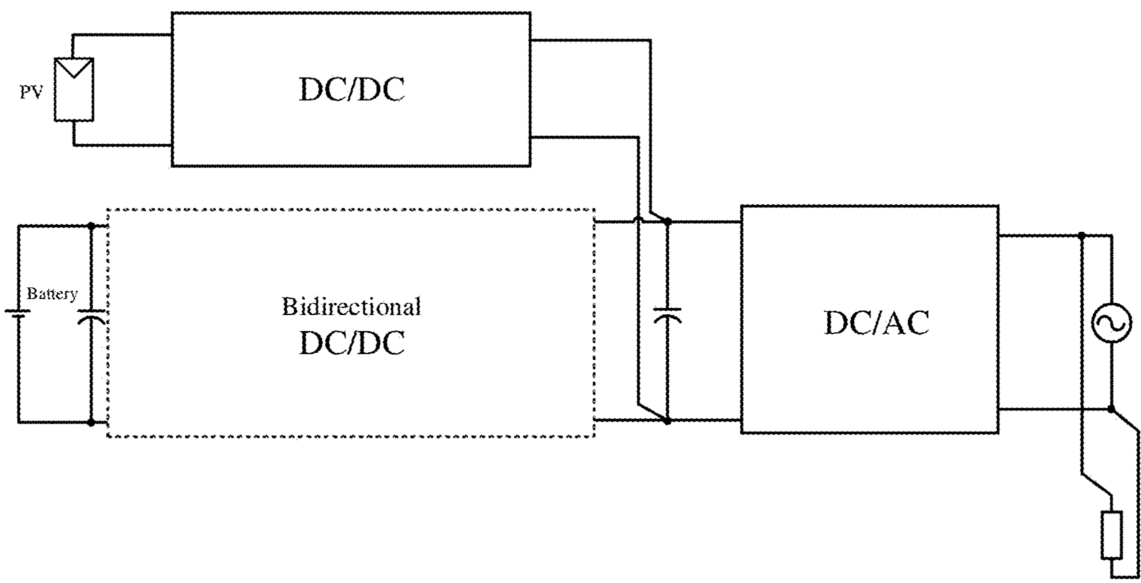

FIG. 2

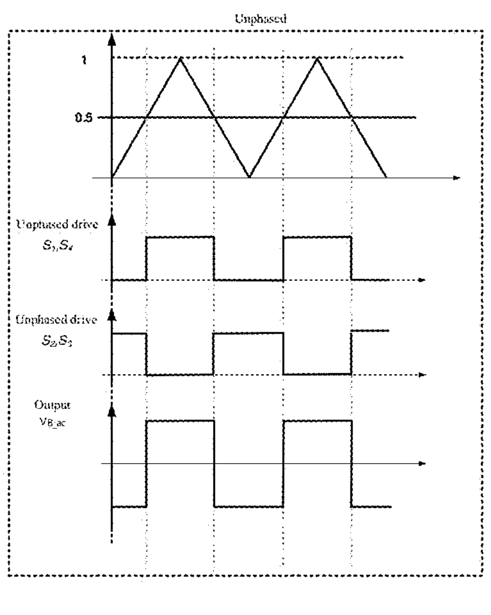
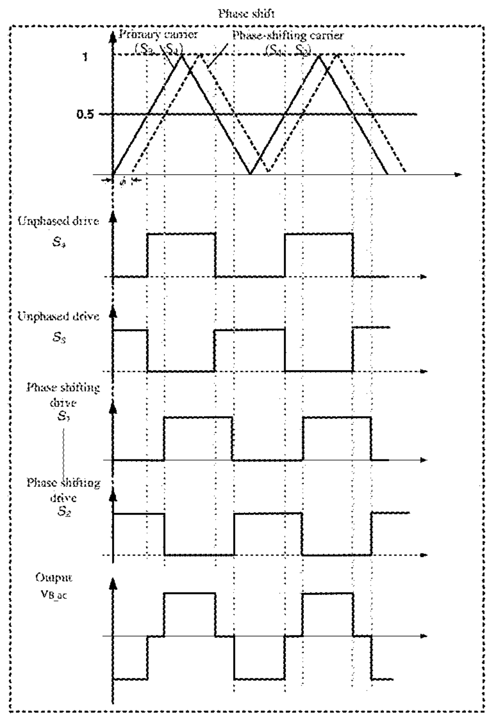
FIG. 6
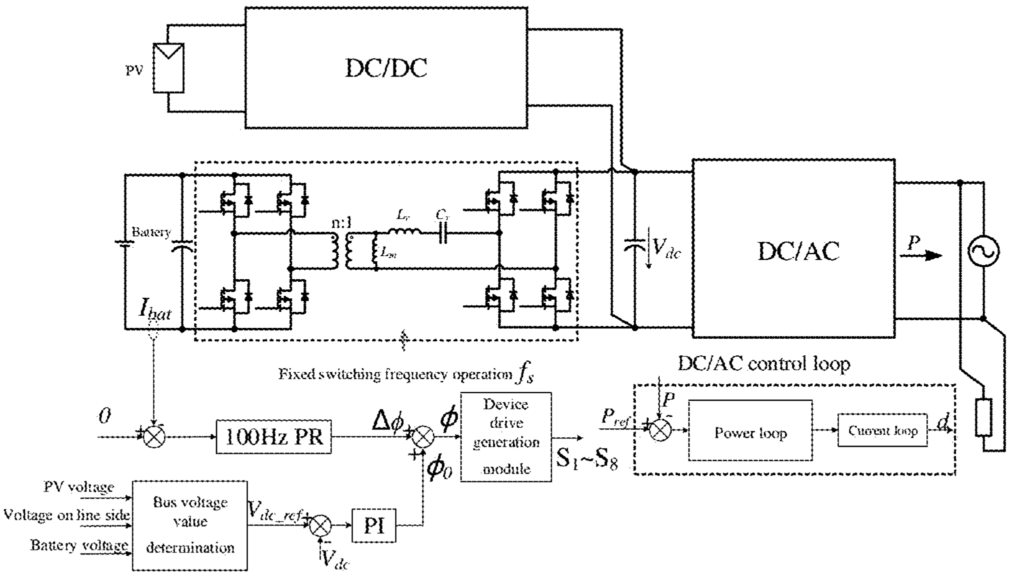
FIG. 7

ENERGY STORAGE SYSTEM CONTROL METHOD, DEVICE AND ENERGY STORAGE SYSTEM

CROSS-REFERENCE TO RELATED APPLICATIONS

This application is a national stage application of PCT/CN2023/116939. This application claims priorities from PCT Application No. PCT/CN2023/116939, filed Sep. 5, 2023, and from the Chinese patent application 202211256365.1 filed Oct. 14, 2022, the content of which are incorporated herein in the entirety by reference.

TECHNICAL FIELD

The present disclosure relates to the field of photovoltaic technology, and in particular to an energy storage system control method, device and energy storage system.

BACKGROUND ART

At present, the commonly used photovoltaic energy storage system architecture is a structure of a common direct current bus; in conjunction with what is shown in FIG. 2, photovoltaic accesses the bus via DC/DC, a battery accesses the bus via bidirectional DC/DC, and a power grid and a load are connected to the bus via DC/AC. The bi-directional DC/DC on the battery side usually adopts the topology of LLC plus Buck/Boost, which has a two-stage structure and is easy to realize the flexible matching between the battery voltage and the bus voltage, with the disadvantages of high cost and large volume. In contrast, single-stage LLC are more advantageous in cost and volume and are thus increasingly used.

The control method for the single stage LLC energy storage system is as follows, as shown in FIGS. 3 and 4: taking the grid-connected mode as an example (the off-grid mode is similar), LLC uses open loop control to operate at a fixed switching frequency, and battery side power is realized by DC/AC power control. For a busbar, the battery side is equivalent to a voltage source, the DC/AC is equivalent to a current source, and the PV side performs MPPT operation or derating operation according to the busbar voltage value. The control method is simple, but has the main disadvantages as follows: 1) for a single-phase system, a large amount of 100 Hz reactive current flows into the battery, resulting in a large amount of low-frequency ripple in the battery current; 2) the bus voltage is determined entirely by the battery side, not taking into account the PV voltage, and when the MPPT voltage of the PV is higher than the bus voltage, it derates so that part of the power is sacrificed.

SUMMARY OF THE DISCLOSURE

The problem to be solved by the present disclosure is how to achieve low-frequency ripple suppression under the condition of avoiding a photovoltaic derating operation.

In order to solve the above problem, the present disclosure provides an energy storage system control method including: acquiring a PV voltage, a battery voltage and a grid-side voltage, determining a bus voltage reference value according to the PV voltage, the battery voltage and the grid-side voltage, and determining a phase shifting angle reference or a frequency reference according to the bus voltage reference value; acquiring a current on battery side, and determining a bridge arm phase shifting angle change amount or frequency change amount according to a low-frequency component of the current on battery side needing to be suppressed; determining a bridge arm phase shifting angle according to the phase shifting angle reference and the bridge arm phase shifting angle change amount, or determining a switching frequency according to the frequency reference and the change amount of the frequency; and suppressing low-frequency ripple according to the bridge arm phase shifting angle or the switching frequency.

Alternatively, the determining the bus voltage reference value according to the PV voltage, the battery voltage and the grid-side voltage includes: determining a first bus voltage according to the PV voltage, determining a second bus voltage according to the battery voltage, determining a third bus voltage according to the grid-side voltage, and determining the bus voltage reference value according to a maximum value among the first bus voltage, the second bus voltage and the third bus voltage.

Alternatively, the determining the bridge arm phase shifting angle change amount or frequency change amount according to a low-frequency component of the current on battery side needing to be suppressed includes: comparing the current on battery side with a preset reference value, and inputting the current on battery side and the preset reference value into a resonance controller for suppressing low-frequency ripple, and determining a bridge arm phase shifting angle change amount or frequency change amount according to an output of the resonance controller.

Alternatively, the suppressing low-frequency ripple according to the bridge arm phase shifting angle or the switching frequency includes: performing the phase shifting according to the bridge arm phase shifting angle, or adjusting the switching frequency.

Alternatively, the performing the phase shifting according to the phase shifting includes: sending the bridge arm phase shifting angle to a drive generator module to achieve phase shifting so that an output voltage varies in order to suppress the low-frequency ripple.

Alternatively, the energy storage system control method further includes: setting a maximum amplitude of allowable fluctuation of the low-frequency ripple, and the low-frequency ripple suppression operation being performed only when the current ripple is greater than the maximum amplitude.

Alternatively, the energy storage system control method further includes: adjusting the phase shifting angle reference or the frequency reference according to a load current.

Alternatively, the energy storage system control method further includes: suppressing a current on battery side high-frequency component according to the bridge arm phase shifting angle or the switching frequency.

For the energy storage system control method according to the present disclosure, a phase shifting mode or a frequency-modulation mode is used to suppress low-frequency ripple, wherein in the phase shifting mode, the switching frequency remains unchanged, and the bridge arm phase shifting angle is changed to realize low-frequency ripple suppression, and in the frequency-modulation mode, the switching frequency is adjusted to realize low-frequency ripple suppression, and both the phase shifting mode and the frequency-modulation mode substantially control the differential pressure at the two sides of the DC/DC, thereby being able to suppress the low-frequency ripple; at the same time, the reference value of the bus voltage is determined according to the PV voltage, the battery voltage and the grid-side voltage, so as to determine the phase shifting angle reference or the frequency reference, which can make the PV at the MPPT point as far as possible and effectively avoid the photovoltaic derating operation.

The present disclosure also provides an energy storage system control device including a computer readable storage medium storing a computer program and a processor, the computer program when read and executed by the processor implements the energy storage system control method as described above. The energy storage system control device has the same advantages as the energy storage system control method described above with respect to the prior art and will not be described in detail herein.

The present disclosure also provides an energy storage system including an energy storage system control device as described above. The energy storage system has the same advantages as the above-described energy storage system control method with respect to the prior art and will not be described in detail herein.

BRIEF DESCRIPTION OF THE DRAWINGS

FIG. 1 is a schematic flow diagram of an energy storage system control method according to an embodiment of the present disclosure;

FIG. 2 is a schematic diagram of an energy storage system architecture according to an embodiment of the present disclosure;

FIG. 6 is a schematic diagram of device driving according to an embodiment of the present disclosure;

FIG. 7 is a second schematic diagram of a low-frequency ripple suppression process for a single stage LLC energy storage system according to an embodiment of the present disclosure;

DETAILED DESCRIPTION OF THE DISCLOSURE

To make the above objects, features, and advantages of the present disclosure more apparent, a detailed description of specific embodiments of the present disclosure will be made with reference to the accompanying drawings.

As shown in FIG. 1, an embodiment of the present disclosure provides an energy storage system control method including: acquiring a PV voltage, a battery voltage and a grid-side voltage, determining a bus voltage reference value according to the PV voltage, the battery voltage and the grid-side voltage, and determining a phase shifting angle reference or a frequency reference according to the bus voltage reference value; acquiring a current on battery side, and determining a bridge arm phase shifting angle change amount or frequency change amount according to a low-frequency component of the current on battery side needing to be suppressed; determining a bridge arm phase shifting angle according to the phase shifting angle reference and the bridge arm phase shifting angle change amount, or determining a switching frequency according to the frequency reference and the change amount of the frequency; and suppressing low-frequency ripple according to the bridge arm phase shifting angle or the switching frequency.

In particular, in this embodiment, the low-frequency ripples are suppressed mainly in two ways, one of which is phase shifting, i.e. the switching frequency is kept constant and the bridge arm phase shifting angle is changed, and the other of which is frequency modulation. Both the phase shifting mode and the frequency modulation mode need to sample the current on battery side, compare with the reference value 0, and then send it to a 100 Hz resonance (PR) controller.

Figure 3:
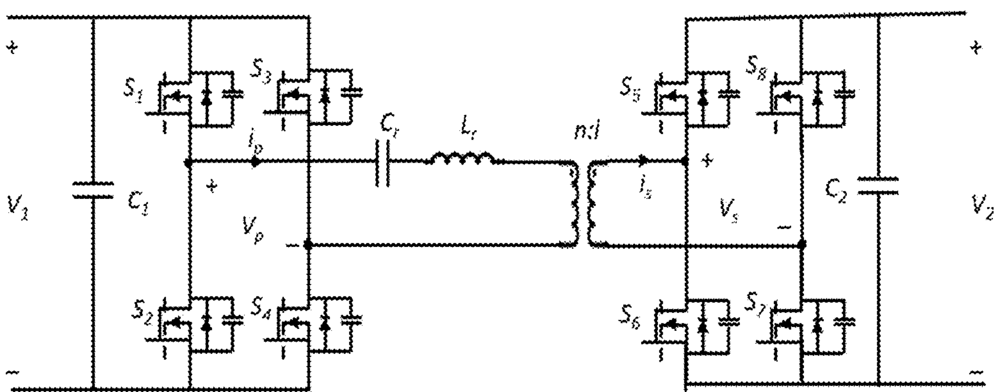
FIG. 3 is a schematic diagram of a single stage LLC according to an embodiment of the present disclosure.
Figure 4:
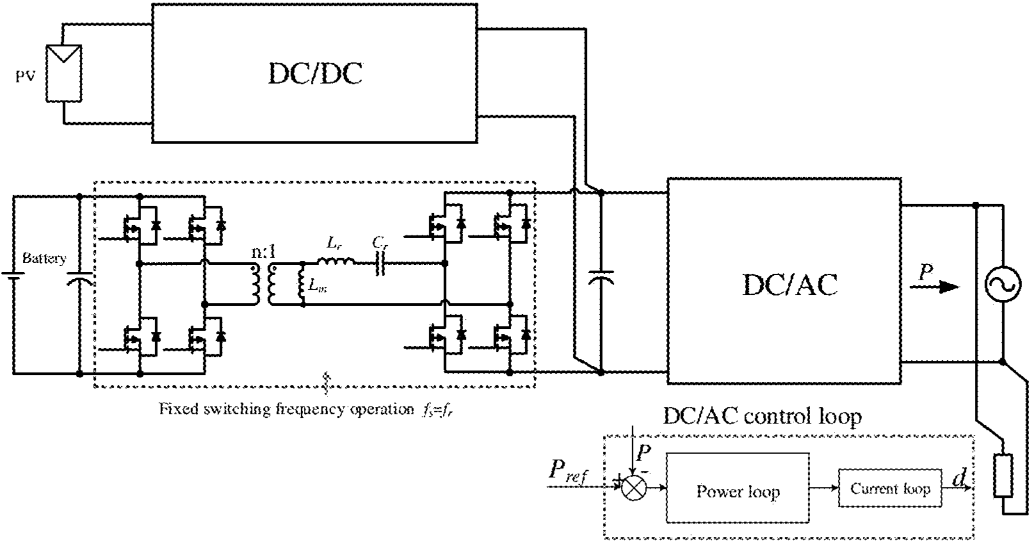
FIG. 4 is a schematic diagram of a control process for a prior art single stage LLC energy storage system according to an embodiment of the present disclosure.
Figure 5:
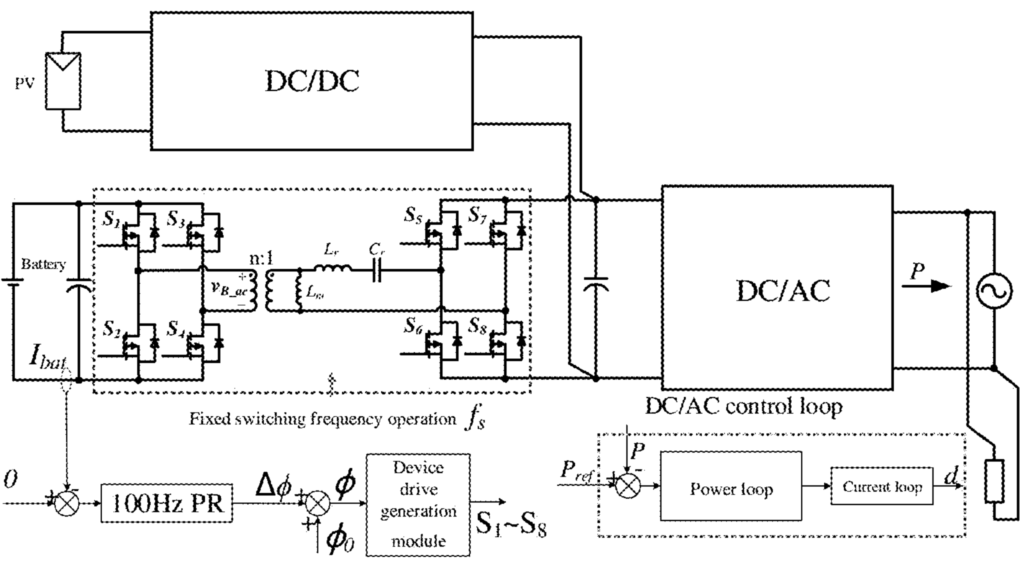
FIG. 5 is a first schematic diagram of a low-frequency ripple suppression process for a single stage LLC energy storage system according to an embodiment of the present disclosure.

(1) Phase Shifting Mode:

with reference to FIG. 5, the current on battery side $I_{bat}$ is first sampled and compared with a reference value of 0, and then sent to a 100 Hz resonance (PR) controller to realize 100 Hz low-frequency ripple suppression. The output of the resonance (PR) controller is taken as the bridge arm phase shifting angle change amount (Δφ), which is added to the phase shifting angle reference (φ0) to finally form the bridge arm phase shifting angle φ. The DC/DC voltage difference is controlled by phase shifting, and the 100 Hz current is suppressed. When the low-frequency ripple is suppressed, it can provide a more stable power supply for electric vehicle charging piles and other equipment.

In connection with the example shown in FIG. 6, taking the power flow from the battery to the bus bar as an example, four devices S1 to S4 on the battery side (S5 to S8 being the same), and before phase shifting, the four tubes are each 50% duty cycle, S1 and S4 being the same, S2 and S3 being the same, S1 and S2 being complementary, and S3 and S4 being complementary. After the carrier phase shift, S1 and S4 are staggered by φ angle drive, S2 and S3 are staggered by φ angle drive, S1 and S2 are complementary, and S3 and S4 are complementary, so that the output voltage $V_{B\_ac}$ changes, and the purpose of suppressing 100 Hz ripple can be achieved.

Since the bus voltage is completely determined by the battery side, the PV voltage (PV, Photovoltaic, Solar Power Generation) is not taken into account. When the MPPT voltage of the PV is higher than the bus voltage, the PV needs to be derated for operation, which sacrifices portion of the PV power. In order to balance PV voltage, it is necessary to make PV at an MPPT point as much as possible, and the specific improvement is as follows.

As shown in connection with FIG. 7, the phase shifting angle reference φ0 is not a fixed value, but the PV voltage, the battery voltage, and the grid-side voltage are taken into account, and then the bus voltage value is determined, thereby determining the phase shifting angle reference φ0.

The bus voltage needs to meet the grid-connected requirements, and the grid-side voltage determines a minimum bus voltage $V_{dc\_Gmin}$; PV needs to achieve MPPT, and determines a lowest bus voltage $V_{dc\_MPPT}$; the battery operates normally, generating a bus voltage $V_{dc\_B}$; the maximum of the three voltages is the bus voltage $V_{dc\_ref}$ required by the system, and the phase shifting angle reference φ0 is determined closed-loop by the bus voltage reference value $V_{dc\_ref}$.

Figures 8, 9:
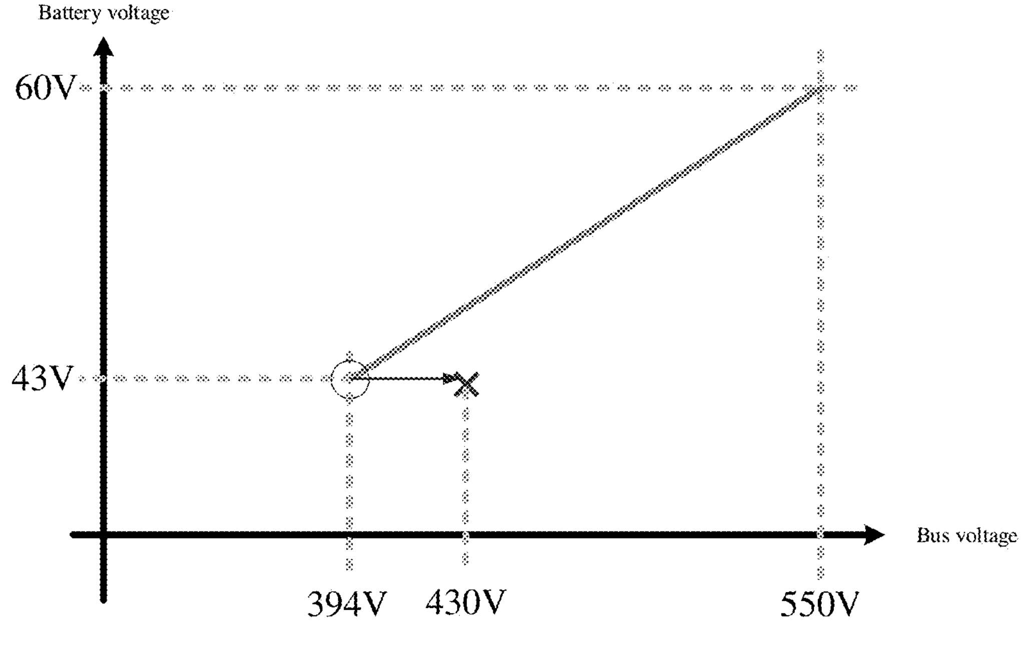
FIG. 8 is a graph of bus voltage versus battery voltage according to an embodiment of the present disclosure.
FIG. 9 is a third schematic diagram of a low-frequency ripple suppression process for a single stage LLC energy storage system according to an embodiment of the present disclosure.

As shown in conjunction with FIG. 8, if the phase shifting angle reference φ0 is a fixed value, the battery voltage and the bus voltage are approximately in a straight line, regardless of fluctuations in 100 Hz ripple suppression. When the voltage of the PV's MPPT is higher than the bus voltage, then the PV must be derated for operation. For example, if the battery voltage is 43 V (the specific voltage value is determined according to the actual situation, and the example is provided for illustration only), then the bus voltage is about 394 V, and when the MPPT voltage of PV is 430 V, then PV must be derated for operation at 394 V. At this time, the bus voltage can be raised to the MPPT voltage of 430 V by increasing the phase shifting angle reference φ0. It can be seen therefrom that the method can effectively avoid the photovoltaic derating operation and ensure the photovoltaic MPPT and the maximum utilization of photovoltaic power.

(2) Frequency Modulation Mode:

with reference to FIG. 9, the current on battery side $I_{bat}$ is first sampled and compared with a reference value of 0, and then sent to a 100 Hz resonance (PR) controller to realize 100 Hz low-frequency ripple suppression. The output of the resonant (PR) controller is taken as the frequency variation (Δf), which is added to the frequency reference ($f_0$), resulting in a switching frequency f. By adjusting the switching frequency, the DC/DC voltage difference can be controlled, and the 100 Hz current can be suppressed.

Figure 10:
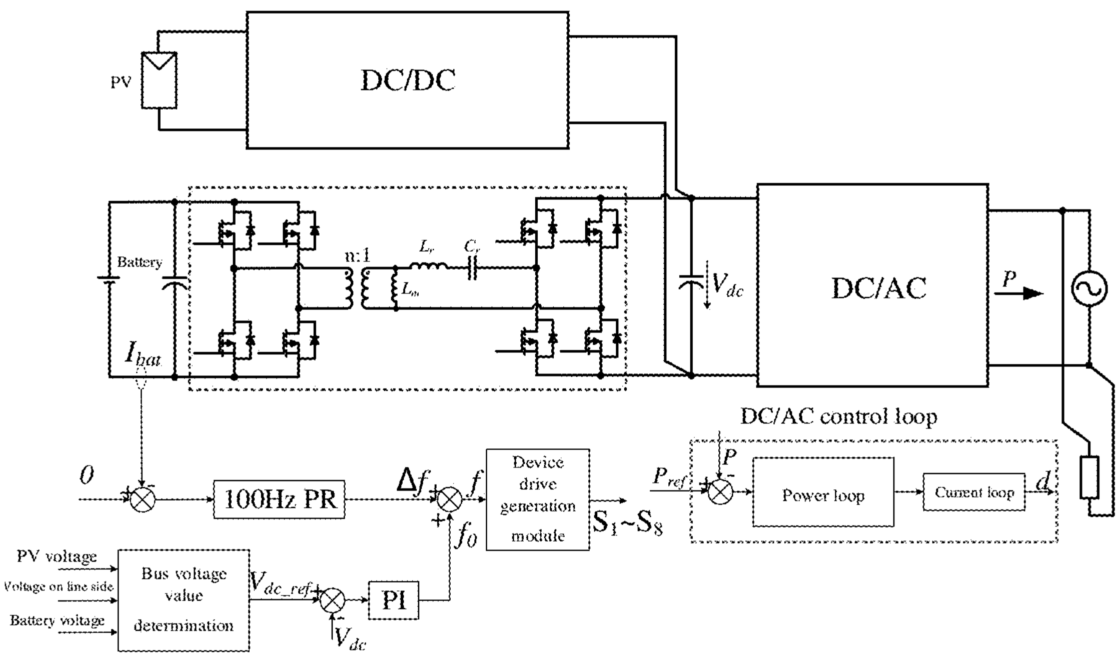
FIG. 10 is a fourth schematic diagram of a low-frequency ripple suppression process for a single stage LLC energy storage system according to an embodiment of the present disclosure.

Similar to the phase shifting mode, the frequency modulation mode also needs to consider the MPPT voltage to avoid the photovoltaic derating operation. As shown in FIG. 10, the frequency reference $f_0$ is not a fixed value, but the PV voltage, the battery voltage, and the grid-side voltage are taken into account, and then the bus voltage value is determined, thereby determining the phase shifting angle reference $f_0$. The bus voltage needs to meet the grid-connected requirements, and the grid-side voltage determines a minimum bus voltage $V_{dc\_Gmin}$; PV needs to achieve MPPT, and determines a lowest bus voltage $V_{dc\_MPPT}$; the battery operates normally, generating a bus voltage $V_{dc\_B}$; the maximum of the three voltages is the bus voltage $V_{dc\_ref}$ required by the system, and the frequency reference $f_0$ is determined closed-loop by the bus voltage reference value $V_{dc\_ref}$.

Figure 11:
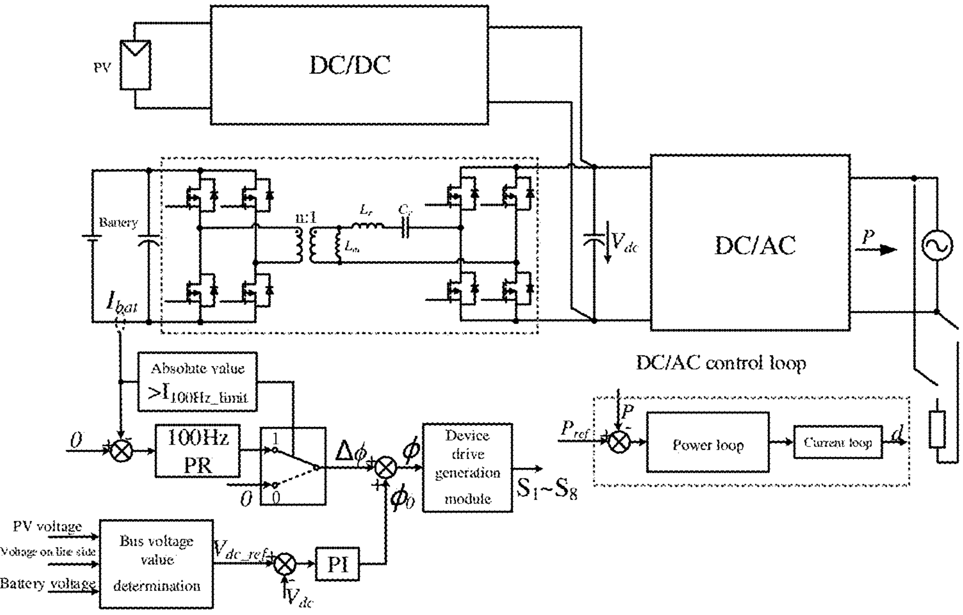
FIG. 11 is a fifth schematic diagram of a low-frequency ripple suppression process for a single stage LLC energy storage system according to an embodiment of the present disclosure.

Since phase shifting or frequency modulation reduces the efficiency of the system to some extent, it is necessary to minimize the impact on system efficiency while suppressing 100 Hz current ripple. In conjunction with FIG. 11, the maximum amplitude $I_{100\ Hz\_limit}$ of the allowable fluctuation of the low-frequency ripple is first set, and when the current ripple is less than this amplitude, the phase shifting angle change amount Δφ is zero, and when the current ripple exceeds this amplitude, the 100 Hz low-frequency ripple suppression control is enabled, and the effect of the low-frequency ripple suppression on the efficiency can be effectively reduced.

Figure 12:
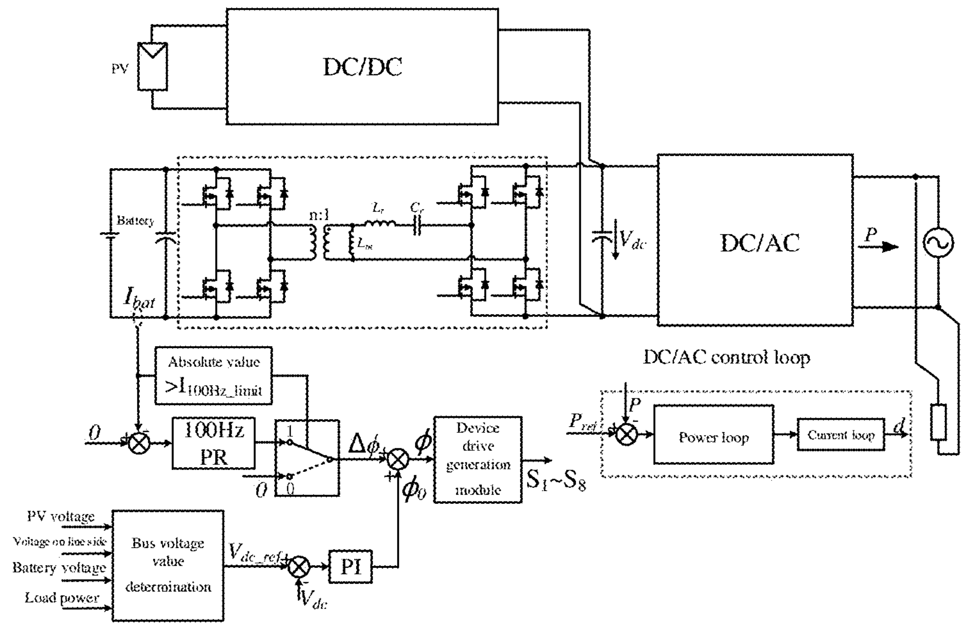
FIG. 12 is a sixth schematic diagram of a low-frequency ripple rejection process for a single stage LLC energy storage system according to an embodiment of the present disclosure.

As shown in connection with FIG. 12, since the phase shifting angle reference φ0 is also controlled by the load current, when the load is small, the corresponding ripple current is also small, meaning that a too large phase shifting angle reference φ0 is not required for low-frequency ripple suppression. When the load current is small, the phase shifting angle reference φ0 is also adjusted to be small, so that the influence on the system efficiency can be reduced.

Figure 13:
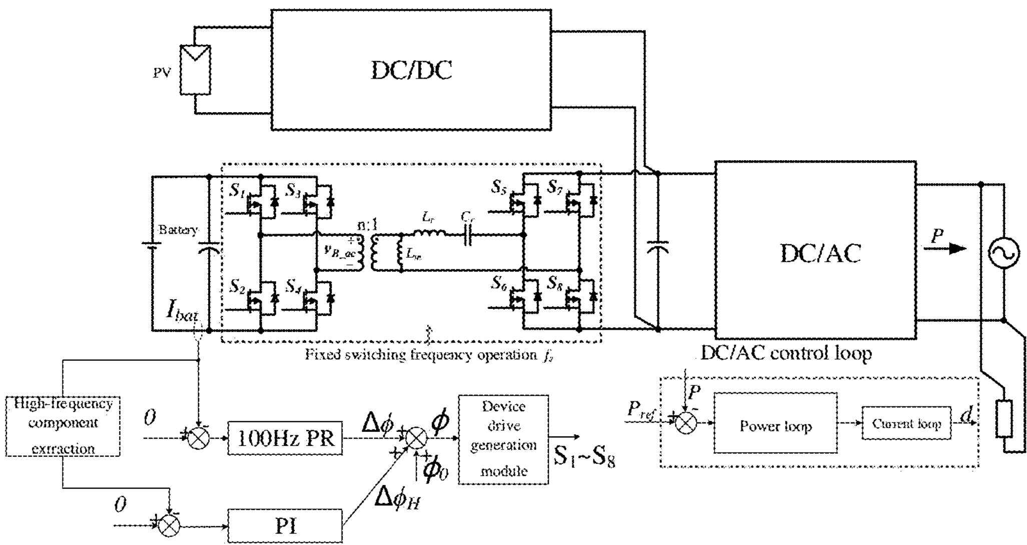
FIG. 13 is a schematic diagram of high-frequency current suppression for a single stage LLC energy storage system according to an embodiment of the present disclosure.

As shown in FIG. 13, the battery-side current $I_{bat}$ is subjected to high-frequency component extraction, and the high-frequency component extraction module can extract a high-frequency component in the current, such as a component of 800 Hz to 5 kHz. Then a closed-loop control is performed, the command value is zero, and a phase shifting angle change amount $\Delta\varphi_H$ is generated after PI control and added to a phase shifting reference φ0. After the control, the high-frequency component in the current can be effectively suppressed.

Alternatively, the determining the bus voltage reference value according to the PV voltage, the battery voltage and the grid-side voltage includes: determining a first bus voltage according to the PV voltage, determining a second bus voltage according to the battery voltage, determining a third bus voltage according to the grid-side voltage, and determining the bus voltage reference value according to a maximum value among the first bus voltage, the second bus voltage and the third bus voltage.

Specifically, the grid-side voltage determines a minimum bus voltage $V_{dc\_Gmin}$; PV needs to achieve MPPT, and determines a lowest bus voltage $V_{dc\_MPPT}$; the battery operates normally, generating a bus voltage $V_{dc\_B}$; the maximum of the three voltages is the bus voltage $V_{dc\_ref}$ required by the system.

Alternatively, the determining the bridge arm phase shifting angle change amount or frequency change amount according to a low-frequency component of the current on battery side needing to be suppressed includes: comparing the current on battery side with a preset reference value, and inputting the current on battery side and the preset reference value into a resonance controller for suppressing low-frequency ripple, and determining a bridge arm phase shifting angle change amount or frequency change amount according to an output of the resonance controller.

Specifically, the battery-side current $I_{bat}$ is first sampled and compared with a reference value 0, and then sent to a 100 Hz resonance (PR) controller (which may be another controller and is not limited to a resonance controller) to achieve 100 Hz low-frequency ripple suppression. The output of the resonant (PR) controller is taken as the bridge arm phase shifting angle change amount (Δφ) or the frequency change amount (Δf).

Alternatively, the suppressing low-frequency ripple according to the bridge arm phase shifting angle or the switching frequency includes: performing the phase shifting according to the bridge arm phase shifting angle, or adjusting the switching frequency.

Alternatively, the performing the phase shifting according to the phase shifting includes: sending the bridge arm phase shifting angle to a drive generator module to achieve phase shifting so that an output voltage varies in order to suppress the low-frequency ripple.

Specifically, After the carrier phase shift, S1 and S4 are staggered by φ angle drive, S2 and S3 are staggered by φ angle drive, S1 and S2 are complementary, and S3 and S4 are complementary, so that the output voltage $V_{B\_ac}$ changes.

Alternatively, the energy storage system control method further includes: setting a maximum amplitude of allowable fluctuation of the low-frequency ripple, and the low-frequency ripple suppression operation being performed only when the current ripple is greater than the maximum amplitude.

Specifically, the maximum amplitude $I_{100\ Hz\_limit}$ of the allowable fluctuation of the low-frequency ripple is first set, and when the current ripple is less than this amplitude, the phase shifting angle change amount $\Delta\varphi$ is zero, and when the current ripple exceeds this amplitude, the 100 Hz low-frequency ripple suppression control is enabled.

Alternatively, the energy storage system control method further includes: adjusting the phase shifting angle reference or the frequency reference according to a load current.

Alternatively, the energy storage system control method further includes: suppressing a current on battery side high-frequency component according to the bridge arm phase shifting angle or the switching frequency.

Another embodiment of the present disclosure provides an energy storage system control device including a computer readable storage medium storing a computer program and a processor, the computer program when read and executed by the processor implements the energy storage system control method as described above.

Another embodiment of the present disclosure provides an energy storage system including an energy storage system control device as described above.

Although the present disclosure has been described above, the endoscope of protection of the present disclosure is not limited thereto. Various changes and modifications may be effected by a person skilled in the art without departing from the spirit and endoscope of the disclosure, and it is intended that such changes and modifications fall within the endoscope of the appended claims.

The invention claimed is:

1. An energy storage system control method, comprising:

acquiring a PV voltage, a battery voltage, and a grid-side voltage, determining a bus voltage reference value according to the PV voltage, the battery voltage, and the grid-side voltage, and determining a phase shifting angle reference or a frequency reference according to the bus voltage reference value;

acquiring a current on battery side, and determining a bridge arm phase shifting angle change amount or frequency change amount according to a low-frequency component of the current on battery side needing to be suppressed;

determining a bridge arm phase shifting angle according to the phase shifting angle reference and the bridge arm phase shifting angle change amount, or determining a switching frequency according to the frequency reference and the change amount of the frequency; and suppressing low-frequency ripple according to the bridge arm phase shifting angle or the switching frequency.

2. The energy storage system control method according to claim 1, wherein the determining the bus voltage reference value according to the PV voltage, the battery voltage and the grid-side voltage comprises:

determining a first bus voltage according to the PV voltage, determining a second bus voltage according to the battery voltage, determining a third bus voltage according to the grid-side voltage, determining the bus voltage reference value according to a maximum value among the first bus voltage, the second bus voltage and the third bus voltage; and setting a maximum amplitude of allowable fluctuation of the low-frequency ripple, and the low-frequency ripple suppression operation being performed when the current ripple is greater than the maximum amplitude and based on the maximum value among the first bus voltage, the second bus voltage and the third bus voltage.

3. The energy storage system control method according to claim 1, wherein the determining the bridge arm phase shifting angle change amount or frequency change amount according to a low-frequency component of the current on battery side needing to be suppressed comprises:

comparing the current on battery side with a preset reference value, and inputting the current on battery side and the preset reference value into a resonance controller for suppressing low-frequency ripple, determining a bridge arm phase shifting angle change amount or frequency change amount according to an output of the resonance controller, and performing the phase shifting according to the bridge arm phase shifting angle, or adjusting the switching frequence based on the bridge arm phase shifting angle change amount or frequency change amount according to an output of the resonance controller.

4. The energy storage system control method according to claim 3, wherein the performing the phase shifting according to the phase shifting comprises:

sending the bridge arm phase shifting angle to a drive generator module to achieve phase shifting so that an output voltage varies in order to suppress the low-frequency ripple.

5. The energy storage system control method according to claim 1, further comprising:

adjusting the phase shifting angle reference or the frequency reference according to a load current.

6. The energy storage system control method according to claim 1, further comprising: suppressing a high-frequency component of the current on battery side according to the bridge arm phase shifting angle or the switching frequency.

7. An energy storage system control device, comprising a computer readable storage medium storing a computer program, and a processor, the computer program when read and executed by the processor implementing the energy storage system control method according to claim 1.

8. An energy storage system, comprising the energy storage system control device according to claim 7.

9. The energy storage system control device according to claim 7, wherein the determining the bus voltage reference value according to the PV voltage, the battery voltage and the grid-side voltage comprises:

determining a first bus voltage according to the PV voltage, determining a second bus voltage according to the battery voltage, determining a third bus voltage according to the grid-side voltage, and determining the bus voltage reference value according to a maximum value among the first bus voltage, the second bus voltage and the third bus voltage, and adjusting the phase shifting angle reference or the frequency reference according to a load current and bus voltage reference value.

10. The energy storage system control device according to claim 7, wherein the determining the bridge arm phase shifting angle change amount or frequency change amount according to a low-frequency component of the current on battery side needing to be suppressed comprises:

comparing the current on battery side with a preset reference value, and inputting the current on battery side and the preset reference value into a resonance controller for suppressing low-frequency ripple, determining a bridge arm phase shifting angle change amount or frequency change amount according to an output of the resonance controller, and performing the phase shifting according to the bridge arm phase shifting angle, or adjusting the switching frequency.

11. The energy storage system control device according to claim 10 wherein the performing the phase shifting according to the phase shifting comprises: sending the bridge arm phase shifting angle to a drive generator module to achieve phase shifting so that an output voltage varies in order to suppress the low-frequency ripple.

12. The energy storage system control device according to claim 7, wherein the energy storage system control method further comprises: setting a maximum amplitude of allowable fluctuation of the low-frequency ripple, and the low-frequency ripple suppression operation being performed only when the current ripple is greater than the maximum amplitude.

13. The energy storage system control device according to claim 7, wherein the energy storage system control method further comprises: suppressing a high-frequency component of the current on battery side according to the bridge arm phase shifting angle or the switching frequency.

* * * * *